Sept. 8, 1942.                C. W. BELDEN                 2,295,325
                         COLOR-MATCHING DEVICE
                         Filed March 3, 1941          4 Sheets-Sheet 1

Inventor:
Charles W. Belden
By Harold Olsen
Attorney.

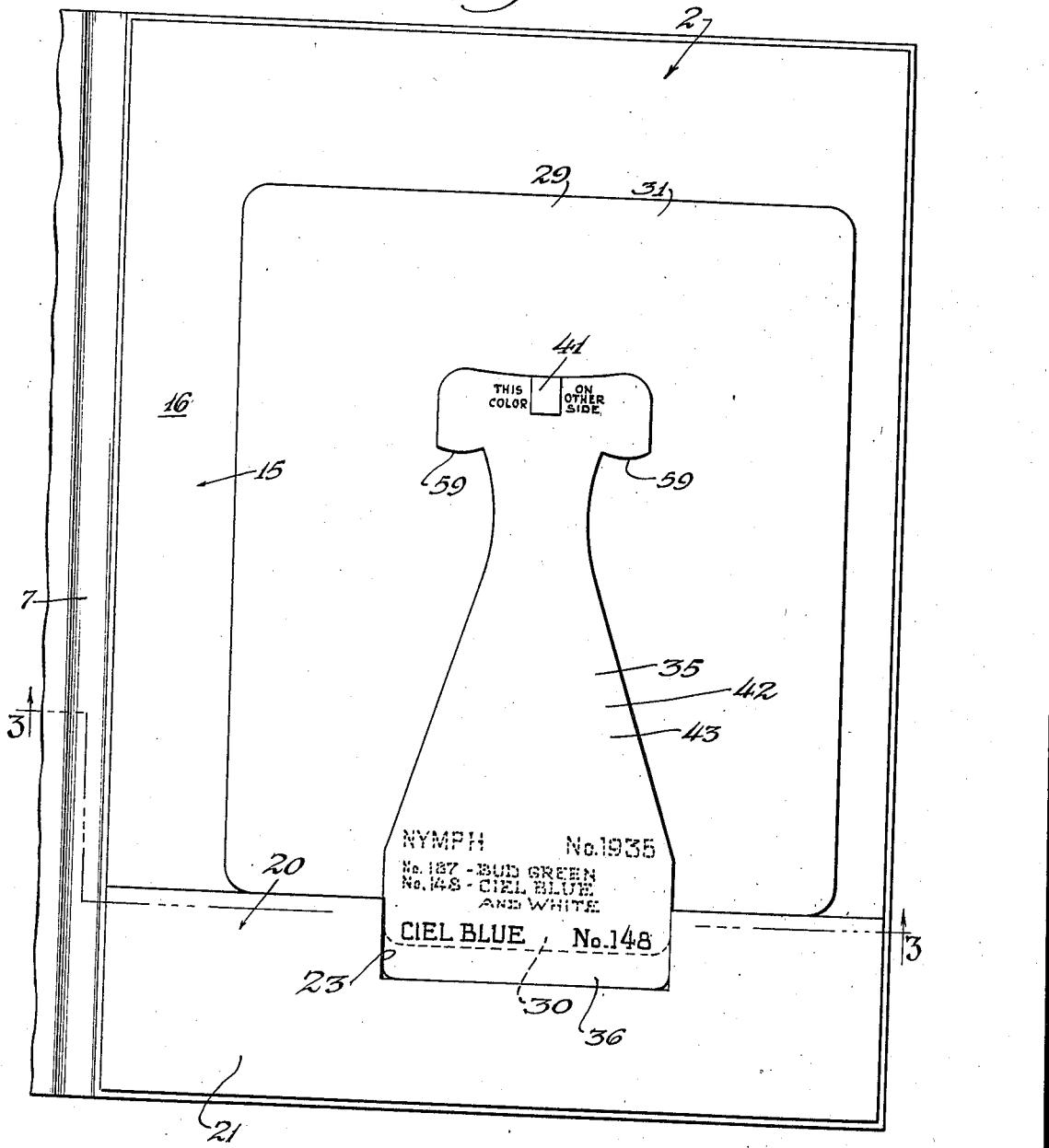

Sept. 8, 1942.   C. W. BELDEN   2,295,325
COLOR-MATCHING DEVICE
Filed March 3, 1941     4 Sheets-Sheet 3
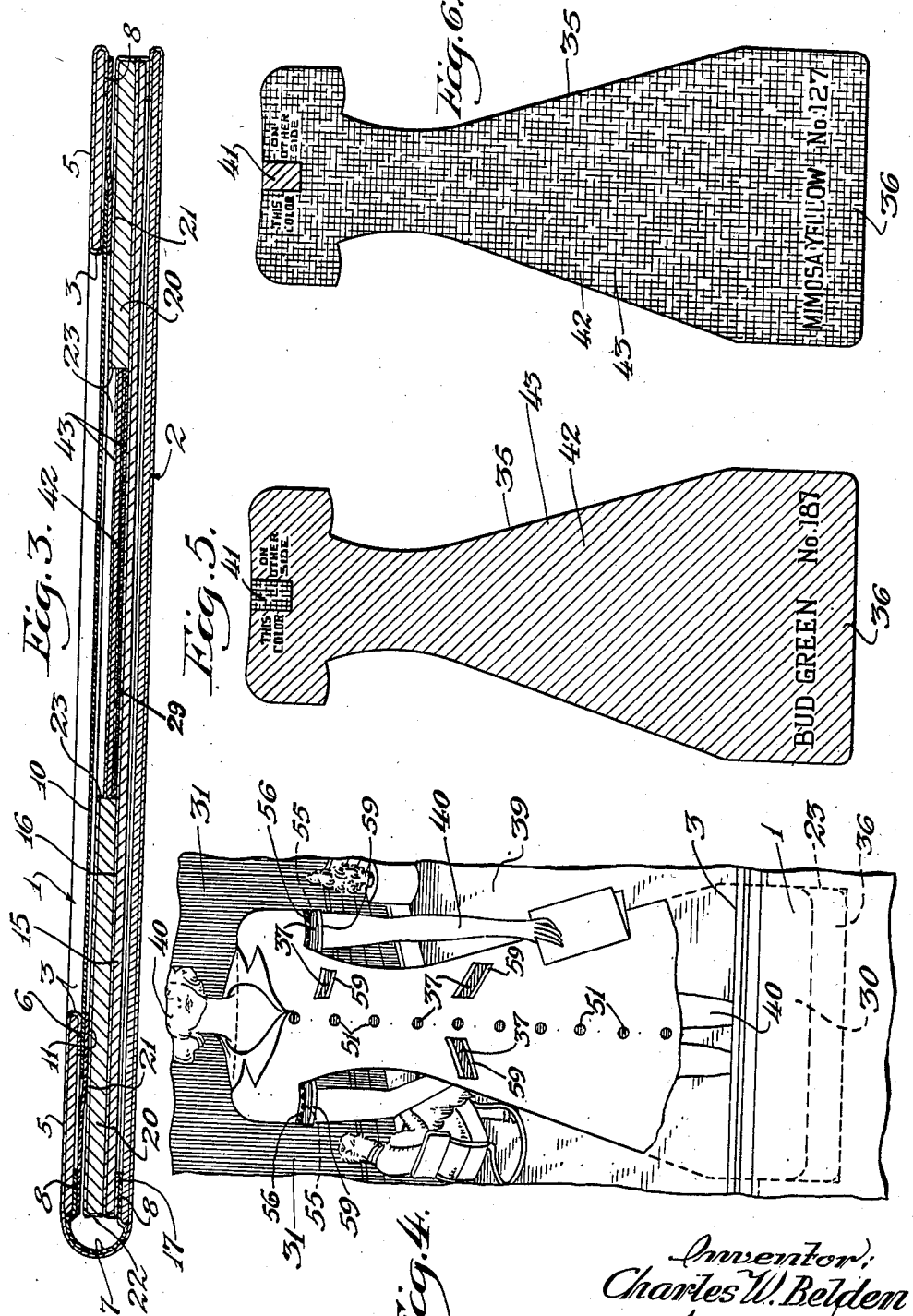

Sept. 8, 1942.                C. W. BELDEN                2,295,325
                          COLOR-MATCHING DEVICE
                          Filed March 3, 1941            4 Sheets-Sheet 4
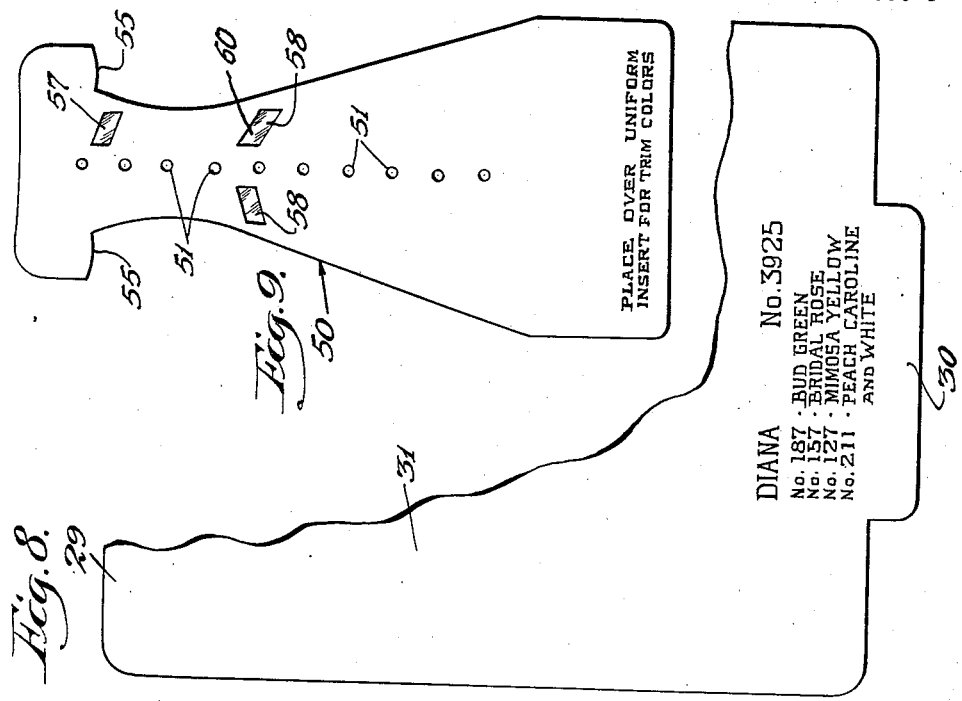
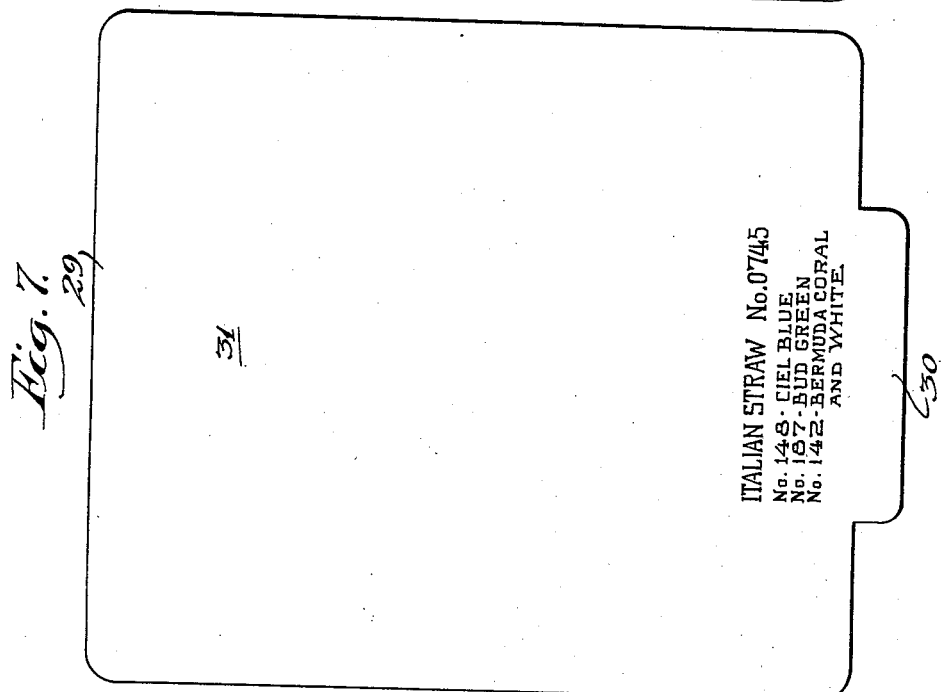
Inventor
Charles W. Belden
By Harold Olsen
Attorney Patented Sept. 8, 1942

2,295,325

UNITED STATES PATENT OFFICE 2,295,325

COLOR-MATCHING DEVICE

Charles W. Belden, Chicago, Ill., assignor, by mesne assignments, to American Linen Company, Los Angeles, Calif., a corporation of California Application March 3, 1941, Serial No. 381,442

20 Claims. (Cl. 35—56)

This invention relates to improvements in devices for assisting in matching colors to obtain color harmony between the color scheme of a room and some object or person in relation to that scheme, as between a dress or costume and the finishing colors of a room and/or of the furniture and/or of the hangings in a room.

The invention has found valuable application in assisting in selection of uniforms for waitresses or floor girls in restaurants, particularly where linen service is desired. The device is considered to be part of a color harmony guide system so designed as to offer a complete color selection service for suggesting the colors of uniforms or dresses or costumes which will be complementary to or blend correctly with a present color scheme or contemplated color scheme for the interior decoration of a room.

The invention includes the specific construction of a book, and the use of a device having separable parts with the book so constructed that by the substitution of various panels, color comparisons can be easily and quickly made, and so that a large number of different color comparisons can be made.

Certain companies who are in the laundry business offer a service which includes uniforms for employees in offices, stores and dining rooms. The companies undertake not only to furnish the uniforms, but to wash them periodically and deliver them to those who subscribe for the service.

One of the purposes of the present invention is to enable the buyer of the service to select a color of dress or uniform which will best harmonize with the color scheme of the interior decoration of his establishment.

Color harmony is a science with which few business men are fully acquainted, and therefore it is desirable in selling the service to provide a scheme by which the buyer can obtain a fair idea of what will be the most desirable color from the aesthetic standpoint. The invention is capable of other uses involving the matching of colors.

One feature is to provide a pictorial delineation on transparent material in which the most prominent single element is preferably placed in the foreground or centrally, the element, for example, being a dressed human or other figure. In this case substantially all portions of the figure except the dress are delineated by the use of opaque material so that only color provided by one of the two panels will show through the transparent portion to give color apparently to the dress so that this color may be compared or contrasted directly with another color or colors provided by another panel.

Another feature, used separately or in combination with other panels, is that of providing a panel with openings or cutouts which positionally correspond to trim material such, for example, as is used at the upper edge of pockets or at the lower edge of sleeves or in other locations, and to place this panel with the cutouts over a colored panel and to so register the panel with the figure that only the color showing through the openings and corresponding to the trimming will be seen through the window when the book is closed.

The above schemes and modifications can be used for the selection of colors for a dress or costume of an employee in an office or store or other establishment, the prominent figure in such case representing a dressed employee or manager or proprietor, etc. The invention is not necessarily limited to matching colors between dresses and surrrounding decorations, but may be used for comparing one colored article with another.

Another feature of the invention per se is the construction of one of the small panels, as a laminated structure consisting of a core and layers of colored cloth with the outer surface or face of each cloth layer glazed with waterproof material so that the cloth material can be kept clean. Another feature of the construction of this panel is the placing of an applique or layer of colored material of small area and of the same color as the color on the opposite side of the panel so that while looking at one colored face of the panel one may know without turning the panel face for face what the color of the opposite face is.

Another feature of the invention relates to the centrally placed recess or notch on the inner face of the back leaf and to the symmetrical panels fitting in the notch, in a manner to assure that the panels will either before and after face-for-face reversal always occupy a predetermined relation to respective transparent areas, that is, will unfailingly be held in a position to register with corresponding predetermined areas. Another feature relates to the upward facing of the recess so that the panels may be dropped into it either when the book is held open in the hands as in reading or when the book is placed flatly. In each case the panel can enter the recess either when moved in a direction parallel with the inner surface of the leaf, or when moved in a direction perpendicular to that surface.

Another feature is to provide a series or set of large panels and a series or set of smaller panels, all members of both series being adapted to fit in one and the same recess or notch to be held against movement in a direction parallel with the inner face of the leaf and to assure registration with the corresponding transparent area of the pictorial delineation on the transparent window.

Objects, features and advantages of the invention will appear in the description of the drawings forming a part of this specification, and in said drawings—

Figure 2 is an inner face view of the open book illustrating the arrangement and character of two reversible and removable colored panels;

Figure 3 is a transverse section of the closed book taken approximately on line 3—3 of Figure 2;

Figure 4 is a view similar to Figure 1 showing the central dressed human figure, and illustrating the application of a third panel to certain portions of the dress to give color, for example, only to the trim and buttons;

Figures 5 and 6 are views of opposite sides of the same panel, as one of a series of small panels, each differing from the corresponding panel of Figure 1;

Figures 7 and 8 are views of opposite faces of the same large panel, as one of a series of larger panels, each differing from the corresponding panel of Figure 1; and Figure 9 is a face view of a third panel adapted to be placed in relation to the panels of Figures 5 and 6 to give color only to certain portions of the pictorial delineation of a dress such as the trim and the buttons.

Figure 1:
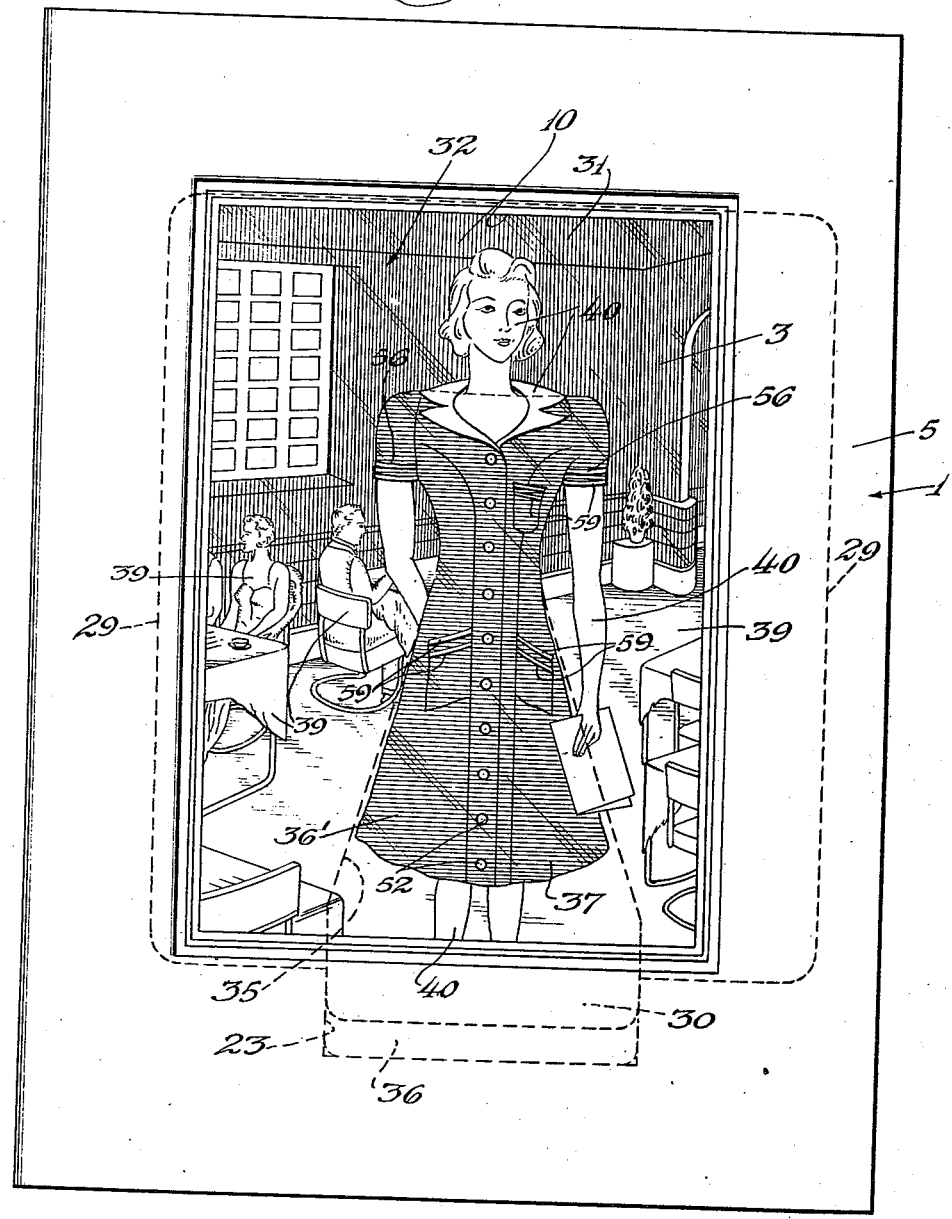
Figure 1 is a view of the outer face of the closed book with colored panels placed in relation to the pictorial delineation of the transparent window and with the colors showing through certain transparent portions of the delineation.

The construction of the book is a feature of the invention. Each leaf comprises a core or base piece (see Figure 3), and in the drawings the base piece for the front leaf is indicated at 1 and the base piece for the back leaf is indicated at 2. These base pieces may be of the same or different thicknesses and ordinarily are composed of cardboard. A window opening 3 is provided in the base piece 1.

Over the outer surfaces of these base pieces and connecting them together and forming part of a hinge therebetween is a sheet of finishing and facing paper indicated at 5. The sheet has an opening corresponding to the window opening. The margins of this finishing sheet are turned around the outer edges of the bases and are brought against and secured to the inner side as at 6. These margins are preferably attached to the inner faces by suitable adhesive (not shown). At the hinge line a reenforcing second layer 7 is provided having portions 8 adhesively attached to the inner surfaces of the base pieces 1 and 2. The margins of the facing sheet 5 are also brought around the edges of the window opening 3 and adhesively secured at the inner side as shown at 6.

Laid against the inner face of the first leaf is a transparent sheet 10 which covers the window opening 3 and forms the transparent window. Holding this transparent sheet 10 in place and providing a finishing material for the inner side of the first leaf is a sheet of material indicated at 11. This sheet has an opening corresponding to the window opening 3 and covers the remaining inner surface of the first leaf and the marginal elements 6 and 8.

Covering the inner face of the second leaf is an element composed of a core or base sheet 15 of cardboard covered with a sheet of finishing material 16, the margins of which are turned around the edges of the core 15 as at 17 and are adhesively secured. Laid against and suitably secured to the finishing material 16 transversely of the leaf is a relatively thick piece of material indicated at 20 which may be of cardboard or other suitable material which is also faced with a sheet of finishing material 21 brought around its edges as at 22. The color and texture of the finishing sheet 21 preferably matches that of the finishing or facing sheets previously described.

The relatively thick piece of material 20 has a recess or notch 23 (see Figure 2) extending downwardly from its upper edge for receiving, centering and holding any one or more of a plurality of panels. The thickness of the material 20 is such as to provide a recess of a depth at least equal to the combined thicknesses of three superposed panel pieces now to be described. The finishing material 21 is not brought around the edges of the recess 23, this finishing material being first applied and adhesively secured and then the notch or recess being cut as by stamping.

Now referring to Figures 1, 2, 7 and 8. There is provided a series of large panels 29 which are reversible, each of which is differently colored on opposite faces. Each panel is preferably made of thin cardboard and the colors are painted on. The indication for color of this panel has not been shown in Figures 2, 7 and 8, but is shown in Figures 1 and 4. The color of the panel shown in Figure 2 is indicated in dotted lines by the word "Nymph." This color Nymph is indicated as pink by lining in Figures 1 and 4. Each of these panels 29 is provided at its bottom with a projection 30 which enters the recess or notch 23 as also shown in Figures 1, 2 and 4. Each panel 29 is reversible and its projection can be introduced into the recess 23 either by movement of the panel in a direction parallel with the inner face of the back leaf, or by movement in a direction perpendicular to that face. The projection not only centers but holds the panel in position and when the outer leaf is closed as in Figure 1, the pink color of the panel herein indicated 31 shows through the corresponding first transparent portion 32 of the delineation of the transparent window 10.

Laid over the panel 29 (see Figures 1 and 2) is a panel 35 of smaller area than the panel 29 and having a portion 36 which enters the recess 23 and cooperates with the edges of the recess to center and hold the panel in the position shown. The color of this panel is in this instance blue, and it gives color to the second transparent area 36' of Figure 1, the blue color being indicated in that figure at 37. Thus, this second smaller panel gives color to the dress of the picture. The opaque portions of the pictorial delineation are indicated at 39 and 40, respectively, referring to that portion of the picture which corresponds to the interior of the room and to the centrally placed figure, in this case a dressed human figure.

The panels 35 are reversible just as are the panels 29. Each panel is preferably made of thin cardboard 42 (see Figure 3) and faced on each side with woven fabric 43, such as would be used for dresses or hangings, upholstery, etc. This fabric is preferably provided with a waterproof coating not shown. That face of the panel 35 shown in Figure 2 is marked Ciel Blue. The opposite side of the panel (not shown) is colored Bermuda Coral. On the blue face of this panel is an "indicator area" 41 which is colored Bermuda Coral. On the opposite face of the panel 35 is a similar color indicator area, colored blue. Thus, one may know without turning the panel face-for-face, what the color of the opposite side is and this is a feature. The indicator areas are made by securing a piece of woven fabric of suitable color and texture, as an applique, on the face of the panel.

There is a series of elements 35 just as there is a series of the elements 29 providing combinations of colors which are complementary, as will be explained later. The outline of the panels 35, of course, in this instance corresponds to the outline of the figure (see Figure 1) but these outlines may be varied and the position of the figure with which they register may be changed from that shown in the drawings. The opaque and transparent areas are arranged so that the proper colors will show through the proper or selected transparent areas.

In Figures 5 and 6 are shown another panel 35 of the series of small panels. Figure 5 shows one face of the panel, and Figure 6 shows the opposite face. These panels have been lined for color, that face shown in Figure 5 being lined for green and that face shown in Figure 6 being lined for yellow. It will be noted that the indicator areas have the color of the hidden face of the panel, the indicator color of Figure 5 being yellow and the indicator area of the panel of Figure 6 being green.

Thus far there has been described two types of panels. There is also a third type of panel (see Figures 4 and 9). This panel is adapted to be laid over any panel like 35 so that the face color of the panel 35 shows through openings in the panel now to be described.

Referring to Figure 9. The third panel is indicated at 50 and it will be understood that although shown on a smaller scale it actually is of approximately the same area as the panels 35, so that when laid over a panel 35 its outline will properly coincide with the dress outline of Figures 1 and 4. The purpose of this panel is to give color only to certain areas of the dress or other area, and this panel 50 is in this instance white in color, although a series of panels, each having a different color, is contemplated. In this instance the panel when in position against the top face of a panel 35 gives color only to the trimming and buttons of the dress.

To the above end the panel 50 has therein circular openings 51 corresponding to the buttons, but it will be noted that when the panel 50 is applied these circular openings are so disposed as to lie intermediately of the buttons 52 (see Figure 1) which are done in opaque white. Since the panel 50 is white and since the buttons 52 are outlined with white opaque pigment or color, the buttons 52 will be invisible when the panel 50 is applied on top of a panel 35.

The edges 55 of the panel 50 lie on a level with or overlap opaque markings 56 of the dress of Figure 1. In addition to the button openings 51, an opening 57 is provided which corresponds to the trim at the upper side of the pocket of the figure of Figure 1 and openings 58 correspond and register with and give color to the trim at the top of the pockets. The strip-like areas 59 are done in opaque color (see Figure 4) so that only color (in the drawing blue color 37) shows through the openings to give color to the trimming and the buttons. It will, of course, be understood that the colors of the panels 35 may be varied and therefore the color of the trim and buttons or other areas of this or other pictures may be varied. There is no intention to limit the use of the panel like 50 to the accentuation of the trim only of dresses, inasmuch as many variations and applications can be made, both to other parts of a dress and to other figures, whether they do or do not represent dresses.

Referring to Figures 2, 7 and 8. It will be noted that each panel 29 has indicated thereon its color, followed by a number. For example, in dotted lines in Figure 2 occurs the word Nymph followed by the number 1935. Also see Figure 7 in which the words "Italian Straw" are followed by the number 0745. These numbers are indicative of the source of a paint or dye of that color which, for example, can be used to finish the walls or furniture or to dye the hangings of a room. The number is preferably that of a manufacturer, that is, the number by which the manufacturer designates or identifies the color. Also printed on each face of each panel 29 is a list of colors, each preceded by a number. Each of the listed colors is complemental to the color on that face of the large panel. For example, Bud Green and Ciel Blue and white are complementary to or can be used with Nymph. The number and color of each item of the list corresponds to the number and color of one of the second panels 35. For example, in Figure 2 the panel 35 is marked Ciel Blue, followed by the number 148, and this color is complemental to Nymph over which it is laid in Figure 2. In dotted lines can be seen on panel 29 the number 148, followed by the designation Ciel Blue.

Referring to Figure 7. The numbers 148, 187 and 142 indicate the source of the corresponding color or dye and may be the manufacturer's identifying number as the number 1935 following the word Nymph may be the manufacurer's identifying number.

An object is to provide a means as well as a method or system by which to use that means for selection of colors of dresses or costumes such that the selected color will harmonize or complement the coloring of the walls, furniture or room decorations.

In order to reduce the amount of illustration only two species of each kind of panel have been illustrated. In fact, only one species of each has been completely illustrated. Figures 7 and 8 represent opposite face views of the same panel and Figures 5 and 6 represent opposite faces of the same panel. Only one face of the panel 35 of Figure 2 is shown, the other being only described.

Following are lists of the colors of all sides of a few of the possible panels of the two sets with the indicia produced on their faces for purposes of identification as above mentioned:

Large panels—one face Microcline Green—No. 4715. List, No. 148—Ciel Blue, No. 127—Mimosa Yellow, No. 142—Bermuda Coral, No. 152—Suntan Beige and White. Opposite face, Nymph—No. 1935. List, No. 187—Bud Green, No. 148—Ciel Blue and White.

One face Sheepskin—No. 0915. List, No. 148—Ciel Blue, No. 187—Bud Green, No. 157—Bridal Rose and White. Opposite face, Daphne—No. 3615. List, No. 127—Mimosa Yellow, No. 211—Peach Caroline, No. 142—Bermuda Coral and White.

One face Diana—No. 3925. List, No. 187—Bud Green, No. 157—Bridal Rose, No. 127—Mimosa Yellow, No. 211—Peach Caroline and White. Opposite face, Italian Straw—No. 0745. List No. 148—Ciel Blue, No. 187—Bud Green, No. 142—Bermuda Coral and White.

A large panel having only one face white and which need not be reversible bears the legend "Use any uniform color desired."

In the small panels, one face may, for example, be colored Moonbeam Silver No. 128, and has thereon preferably at the top the small indicator layer or patch of material colored Corinthian Wine, which is the color of the opposite face and this color is indicated on the opposite face and is designated No. 192. On the opposite Corinthian Wine face there is placed an indicator patch or layer colored Moonbeam Silver. Each of the remaining small panels has the same construction, including the small areas of coloring, indicating the character of the color on the opposite face. These areas are not mentioned herebelow, however. Other small panels are colored as follows:

One face Ciel Blue No. 148, opposite face, Bermuda Coral No. 142; both faces white; one face Bud Green No. 187, opposite face, Mimosa Yellow No. 127; one face Peach Caroline No. 211; opposite face, Bridal Rose No. 157; one face Suntan Beige No. 152, opposite face, Wild Orchid No. 163.

The names of some of the colors may, as herein disclosed, be somewhat fanciful. It will be understood that in any system of this kind the names of the colors must correspond with the names selected or originated by the particular supply house or manufacturer. Therefore, it has not been thought necessary in all cases to attempt to describe the exact shade connoted by a given color name since, as between two or more manufacturers or sellers, the same color may have a different name. The essential part of the invention herein regarding color is that a sufficiently diverse number of colors and shades be supplied to allow of a wide range of comparison and selection by the user of the service.

The device is used in the following manner: Suppose either that it is desired to finish a room in the color Nymph or that the room is already finished in that color. In either case the customer wishes to known what color of costume or dress will harmonize with the color Nymph. If the finishing has been completed no attention need be given to the number 1935, since it merely identifies the paint or dye of some manufacturer or seller.

Now by looking at the printed list on the Nymph-colored face of the panel he will see that either Bud Green No. 187 or Ciel Blue No. 148, or white will harmonize with Nymph. Or suppose that Italian Straw is the color which is to be matched (see Figure 7). On this face of the panel is the number 0745, and the list indicates that Ciel Blue, Bud Green, Bermuda Coral or white will harmonize with Italian Straw, and so a second panel like 35 having the proper color is selected and placed against the Italian Straw-colored panel (see Figure 2) or against any other suitable panel 29 which may have been previously placed.

If Nymph is the color of the panel 29, the customer may indicate that color 148 is desired, that is, Ciel Blue. This number 148 is the one used by the manufacturer or seller to identify dye which is used to color goods or to indicate the colored goods itself or the quality and color of the goods. As before stated, it is preferable to have the panels 35 covered with the dyed cloth so that the customer can observe the quality as well as the color of the goods which he might order.

If, after a small panel has been selected as being the proper color for a dress in view of the general color scheme of a room, it is desired, instead of providing an allover color of costume, to provide a costume only trimmed with that color (for example, a white costume trimmed with the color) and it is desired to know how such a costume will harmonize with the decorations, it is necessary only to place the third white panel 50 having the cutouts over the panel 35 and close the book.

It is therefore noted that all three types of panels fit into one and the same recess or opening wherein they are held in overlapping or superposed relation.

I believe it entirely new to hold the panels in a very simple manner shown herein. The notched strip lends itself to a punching operation, as do the panels. The thickness of the recessed strip of course, must be equal to or greater than the combined thickness of the three superposed panels inserted into it.

The means herein are especially desirable today when the interiors of rooms and business concerns are decorated by professionals to appeal to the aesthetic tastes of the customer. It can therefore be seen that the wrong selection of uniforms for employees would or might result in inharmony of color, and it is an object of this invention to avoid such inharmony.

It will be noted in Figure 9 that the openings 57 and 58 have lines to indicate transparent material 60. There is a layer of such material applied to the back of the panel 50, though this material is not otherwise indicated or shown. This layer, of course, also lies back of or covers the openings 51, but does not interfere with the transmission of the color through the openings in the manner shown in Figure 4.

I claim as my invention:

1. A two-leaf book having in one leaf a window of transparent material having a pictorial delineation thereon in part made by the use of opaque material and providing first and second transparent areas, the other leaf having a recess therein and a colored panel adapted to be opposed to and give color to, the first transparent area when the leaves are closed, and having a portion removably fitting said recess to center the panel, and a second colored panel smaller than and overlying the first and having a portion removably fitting said recess and adapted to be opposed to the second transparent area when the leaves are closed.

2. A two-leaf book having in one leaf a window of transparent material having a pictorial delineation thereon in part made by the use of opaque material and providing first and second transparent areas, the other leaf having a recess therein, and a colored panel adapted to be opposed and give color to the first transparent area when the leaves are closed, and having a portion removably fitting said recess to center the panel, a second colored panel smaller than and overlying the first and having a portion removably fitting said recess and adapted to be opposed to the second transparent area when the leaves are closed, and a third panel overlying the second and having a portion removably fitting said recess and having openings therein through which the color of the second panel is observable, said openings being adapted to register with selected portions of the second transparent area.

3. A two-leaf book having in one leaf a window of transparent material having a pictorial delineation thereon in part made by the use of opaque material and providing first and second transparent areas, the other leaf having a recess therein, and a colored panel adapted to be opposed to and give color to, the first transparent area when the leaves are closed, and having a portion removably fitting said recess to center the panel and a second colored panel smaller than and overlying the first and having a portion removably fitting said recess and adapted to be opposed to the second transparent area when the leaves are closed, and having openings therein through which the color of the first panel is observable, said openings being adapted to register with selected portions of the second transparent area.

4. A two-leaf book having in one leaf a window of transparent material having a pictorial delineation thereon in part made by the use of opaque material to provide first and second transparent areas, the first corresponding to selected areas of a room and the second corresponding to the dress of a human figure, the other leaf having a recess therein, and a colored panel adapted to be opposed to and give color to, the first transparent area when the leaves are closed, and having a portion removably fitting said recess to center the panel, a second colored panel smaller than and overlying the first and having a portion removably fitting said recess and adapted to be opposed to the second transparent area when the leaves are closed, and a third panel overlying the second and having a portion removably fitting said recess and having openings therein through which the color of the second panel is observable, said openings being adapted to register with selected portions of the second transparent area.

5. A two-leaf book having in one leaf a window of transparent material having a pictorial delineation thereon in part made by the use of opaque material to provide first and second transparent areas, the first corresponding to certain areas of a room and the second corresponding to the dress of a human figure, including areas defining trimming of the dress, the other leaf having a recess therein, and a colored panel adapted to be opposed to and give color to, the first transparent area when the leaves are closed, and having a portion removably fitting said recess to center the panel and a second colored panel smaller than and overlying the first and having a portion fitting said recess and adapted to be opposed to the second transparent area when the leaves are closed, and a third panel overlying the second and having a portion removably fitting said recess and having openings therein through which the color of the second panel is observable, said openings being adapted to register with and give color only to the aforesaid areas which positionally correspond to the trimming.

6. A two-leaf book having in one leaf a window of transparent material having a pictorial delineation thereon in part made by the use of opaque material to provide first and second transparent areas, the other leaf having a recess therein, and a colored panel adapted to be opposed to and give color to, the first transparent area when the leaves are closed, and having a portion fitting said recess to center the panel, and a second panel differently colored on opposite faces, each face having a small area of the same color as that of the opposite face, said second panel overlying the first and having a portion removably fitting said recess and adapted to be opposed to the second transparent area when the leaves are closed.

7. A two-leaf book having in one leaf a window of transparent material having a pictorial delineation thereon in part made by the use of opaque material to provide first and second transparent areas, the other leaf having a recess therein, and a reversible panel having opposite sides differently colored and adapted to be opposed to the first transparent area when the leaves are closed, and having a portion removably fitting said recess to center the panel, and a second reversible panel differently colored on its opposite faces and overlying the first and having a portion removably fitting said recess and adapted to be opposed to the second transparent area when the leaves are closed.

8. A two-leaf book having in one leaf a window of transparent material having a pictorial delineation thereon in part made by the use of opaque material to provide first and second transparent areas, the other leaf having a recess therein centrally placed and facing upwardly, and a reversible panel having each face differently colored and adapted to be opposed to the first transparent area when the leaves are closed, and having a centrally disposed extension fitting said recess to center the panel and to assure that said panel will always occupy a predetermined relation to said transparent area when reversed.

9. A panel of sheet material, having the entire area of each of only two opposite faces of greatest area differently colored, each face having thereon a small area which has the same coloring as that of the opposite face, whereby one can know what the color of the opposite face is without reversing the panel to look at that opposite face.

10. A panel of the class described, differently colored on opposite faces, each face having thereon a small area which has the same coloring as that of the opposite face, whereby one can know what the color of the opposite face is without reversing the panel to look at that opposite face, the said panel having an irregular outline which is symmetrical with relation to a longitudinal midline of the panel.

11. A two-leaf book having in one leaf a window of transparent material having a pictorial delineation thereon in part made by the use of opaque material and providing first and second transparent areas, the second leaf having a centrally placed recess therein, and a symmetrically shaped reversible panel of special configuration adapted to be opposed to and register with the second transparent area when the leaves are closed, and having a portion removably fitting within said recess.

12. A two-leaf book of the class described, having in one leaf a window of transparent material having a pictorial delineation thereon in part made by the use of opaque material to provide first and second transparent areas, the other leaf of the book having attached to its inner face a relatively thick piece of material having a notch in its upper edge, adapted to receive a portion of a panel when that panel is laid against the inner face of the second leaf, all in a manner to hold the panel against motion in a direction parallel with said inner face and in a position to register with one of said transparent areas when the book is closed.

13. A two-leaf book of the class described having in one leaf a window of transparent material having a pictorial delineation thereon in part made by the use of opaque material to provide first and second transparent areas, the other leaf of the book having attached to its inner face a relatively thick piece of material having a notch in its upper edge adapted to receive a portion of a panel when that panel is laid against the inner face of the second leaf to hold the panel against motion in a direction parallel with said inner face and in a position to register with one of said transparent areas when the book is closed, the thickness of said piece being at least equal to the combined thickness of three superposed and flatly engaged panels to hold such panels in the manner and for the purpose mentioned.

14. A two-leaf book of the class described comprising two leaf-forming base members, one member having a window opening therein, a single sheet of paper facing both members and forming a hinge therebetween and extending and overlapped at the inner face of each member, a transparent sheet on the inner side of said first leaf and covering said opening, a sheet of finishing material securing said transparent sheet in position, said transparent sheet having pictorial delineations thereon in part made by the use of opaque material to provide first and second transparent areas, the other base member of the book being faced on the inner side with a core sheet of material covered with finishing material, a relatively thick piece of material secured against the last mentioned finishing material and having a notch or recess in its upper edge adapted to receive a portion of a panel which is laid against the inner face of the second leaf and adapted to hold the panel against motion in a direction parallel with said inner face and in a position to register with one of said transparent areas when the book is closed, the thickness of said panel being at least equal to the combined thicknesses of three superposed and flatly engaged panels to hold said panels in the manner and for the purpose mentioned.

15. A two-leaf book having on one leaf a transparent window having a picture or the like thereon, the opposite leaf having on the inner side removably fixed panels adapted to give color to parts of the picture when the leaves are closed, said panels comprising a first panel adapted to give color to one part of the picture, a second panel laid against the first and adapted to give color to another part of the picture, and a third masking panel laid against the second and having openings through which the color of the second panel shows to give color only to certain parts of the last mentioned part of the picture.

16. A two-leaf book having on one leaf a transparent window having a picture or the like thereon, the opposite leaf having on the inner side removably fixed panels adapted to give color to parts of the picture when the leaves are closed, said panels comprising a first panel adapted to give color to one part of the picture, a second panel laid against the first and adapted to give color to another part of the picture, the second panel having an outline corresponding to that of said last mentioned portion, and a third masking panel laid upon the second and of substantially the same size and configuration as the second panel, said third panel having openings through which the color of the second panel shows to give color only to certain parts of said last mentioned portion of the picture.

17. A two-leaf book having on one leaf a transparent window having a picture or the like thereon, the opposite leaf having on the inner side detachably fixed in a common recess panels which are adapted to give color to parts of the picture when the leaves are closed, said panels comprising a first panel adapted to give color to one part of the picture, a second panel laid against the first and adapted to give color to another part of the picture which is substantially less in area than that of the first mentioned part of the picture, said second panel having an outline corresponding to that of said lesser area, and a third panel laid upon the second and of substantially the same size and configuration as the second panel, said third panel having openings through which the color of the second panel shows to give color only to certain parts of said lesser area.

18. A two-leaf book having in one leaf a window of transparent material having a pictorial delineation thereon in part made by the use of opaque material and providing first and second transparent areas, the second area being centrally arranged with respect to the first, and the other leaf having a recess therein centrally arranged with respect to the second area, a first panel having a different color on each opposite side and having a portion entering the recess to permit the panel to be reversed and yet be capable of registering with the first area when the leaves are closed, and a second panel differently colored on opposite sides with at least one of the colors complementary to one of the colors of the first panel, the second panel having a portion removably fitting said recess to permit the panel to be reversed and yet be capable of registration with the second area.

19. A device of the class described, comprising a two-leaved book, one leaf having a window of transparent material having a pictorial delineation thereon in part made by the use of opaque material and providing first and second transparent areas, the second of which is centrally placed and comprises a dressed figure including outlines of buttons and trim as transparent areas, the other leaf having a recess centered in relation to the figure when the leaves are closed, a colored panel adapted to give color to the first transparent area and having a portion adapted to removably fit the recess, a second colored panel adapted to give color to the second area and having a portion adapted to removably fit the recess, and a third panel having openings therein which positionally correspond to the buttons and to the trim of the second area, and through which color of the second panel is given only to said buttons and trim.

20. A color-matching device comprising a series of first panels, each having opposite faces differently colored, each face having thereon a designation of its color and a number by which the color is identified, and each face further having thereon a list of color designations of which each color is complemental to the color of that face and each designation having an identifying number, a second series of panels, any one of which is adapted to be laid in opposition to any one of the first panels, each second panel having opposite faces differently colored and each face having thereon a small area which has the same color as that of the opposite face whereby examination of one face of each member of the second series of panels enables one to know what the color of the opposite face is without reversing the panel, at least one of the faces of the members of the second series being complementary to a color of a face of one of the series of first panels, each face of each series of the second series having a designation thereon indicating the color of that face along with an identifying number corresponding to a number on at least one of the faces of one of the members of the series of first panels.

CHARLES W. BELDEN.